United States Patent
Cheng et al.

(10) Patent No.: US 10,209,864 B2
(45) Date of Patent: Feb. 19, 2019

(54) UI DIFFERENTIATION BETWEEN DELETE AND CLEAR

(75) Inventors: Karen Cheng, San Francisco, CA (US); Benjamin Edward Rampson, Woodinville, WA (US); Chad Barry Rothschiller, Edmonds, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 483 days.

(21) Appl. No.: 13/526,952

(22) Filed: Jun. 19, 2012

(65) Prior Publication Data

US 2013/0339903 A1    Dec. 19, 2013

(51) Int. Cl.
*G06F 3/048* (2013.01)
*G06F 3/0482* (2013.01)
*G06F 3/0488* (2013.01)

(52) U.S. Cl.
CPC .......... *G06F 3/0482* (2013.01); *G06F 3/0488* (2013.01); *G06F 2203/04807* (2013.01)

(58) Field of Classification Search
CPC .... G06F 3/048; G06F 3/04847; G06F 3/0486; G06F 3/0485; G06F 17/24; G06F 17/246; G06F 17/245
USPC ....... 715/764, 769, 770, 781, 790, 799, 833, 715/212, 220
See application file for complete search history.

(56) References Cited

U.S. PATENT DOCUMENTS

| | | | |
|---|---|---|---|
| 6,112,214 A | | 8/2000 | Graham et al. |
| 8,365,084 B1 * | | 1/2013 | Lin et al. ...................... 715/769 |
| 2001/0007988 A1 * | | 7/2001 | Bauchot et al. ............... 707/100 |
| 2003/0164817 A1 * | | 9/2003 | Graham et al. ................ 345/157 |
| 2004/0143788 A1 * | | 7/2004 | Aureglia et al. ............... 715/503 |
| 2007/0011211 A1 * | | 1/2007 | Reeves et al. ................. 707/203 |
| 2011/0163968 A1 * | | 7/2011 | Hogan ................. G06F 3/04883 345/173 |
| 2012/0013540 A1 * | | 1/2012 | Hogan .......................... 345/173 |
| 2012/0054684 A1 * | | 3/2012 | Gossweiler et al. ........... 715/828 |
| 2013/0067396 A1 * | | 3/2013 | Demopoulos ....... G06F 3/04855 715/786 |

OTHER PUBLICATIONS

"iOS UI Element usage Guidelines", Retrieved on: Aug. 18, 2011, http://developer.apple.com/library/iOS/#documentation/UserExperience/Conceptual/MobileHIG/UIElementGuidelines/UIElementGuidelines.html, 1 page.

(Continued)

*Primary Examiner* — Kieu D Vu
*Assistant Examiner* — Asteway T Gattew
(74) *Attorney, Agent, or Firm* — Merchant & Gould P.C.

(57) ABSTRACT

An intuitive user interface for clearing or deleting a structured data element is provided. One or more elements in a data structure may be selected and upon selection of a delete option, the contents of the one or more elements may be cleared. One or more animating panels may be provided which contain elements around the cleared elements. A panel may be moved by a gesture-type action to replace cleared elements. The panels may visually indicate which elements may be moved in place of the cleared elements. The user can visualize how elements may be shifted instead of having to understand terminology in a dialog. Selecting outside the panels may cause the panels to disappear, which may be equivalent to a clear action where other elements are not moved into the place of the deleted elements.

19 Claims, 16 Drawing Sheets

(56) References Cited

OTHER PUBLICATIONS

"XM65 user Guide", Published on: Aug. 2009, http://www.janam.com/downloads/Janam_XM65UserManual_F.082109.pdf, 83 pages.
Table View Programming Guide for iPhone OS, Published on: Oct. 15, 2008, http://cs.rocky.edu/~bennera/Archive/2008-2009/2008_Fall/csc258/notes/AppleDocs/TableView_iPhone.pdf, 62 pages.
"Excel Data Entry Tips and Tricks", Retrieved on: Aug. 17, 2011, http://www.cof.orst.edu/net/software/excel/tips/dataentr.php, 3 pages.
"Herb Tyson Word Bible Blog", Aug. 5, 2011, http://word.herbtyson.com/, 19 pages.
"How to use Excel Mobile on Touch Screen Devices", Retrieved on: Aug. 17, 2011, http://www.smartphonemag.com/cms/node/473, 3 pages.
"How do I Delete One Cell without Deleting an Entire Row?", Jul. 18, 2011, https://discussions.apple.com/thread/3183705?start=0&tstart=0, 2 pages.

* cited by examiner

| | A | B | C | D | E | F |
|---|---|---|---|---|---|---|
| 1 | Guest List | | | | Food Count | |
| 2 | Count | Name | Meat | | Type | Total |
| 3 | 1 | Bob | Beef | | Beef | 1 |
| 4 | 2 | Ann | Chicken | 404  0 | Chicken | 2 |
| 5 | 3 | | Vegetable | | | |
| 6 | 4 | Sarah | Chicken | | | |

FIG 12

UI DIFFERENTIATION BETWEEN DELETE AND CLEAR

BACKGROUND

Oftentimes when manipulating data in a table or a grid structure, the difference between "delete" and "clear contents" commands may be unclear to users. The "delete" functionality may be utilized to delete a cell structure along with all its contents and formatting. When a cell (or an entire row or column) is deleted, the position of content in surrounding cells may be shifted to fill any gaps caused by the deletion. Currently, to use the delete functionality, a user may right click on a cell and select a "delete" command or select a "delete" functionality command from a toolbar.

The "clear contents" functionality may be utilized to delete or empty a cell's contents without removing the cell from a table or worksheet, which would alter the layout of surrounding cells. To clear contents in a cell, a user may either hit a "delete" key on a keyboard or may select a "clear" functionality command from a toolbar. The closeness in terminology and lack of understanding the differences between the functionalities can cause user confusion and frustration.

It is with respect to these and other considerations that the present invention has been made.

SUMMARY

Embodiments of the present invention solve the above and other problems by providing an intuitive user interface for clearing or deleting a structured data element, for example, an element in a grid layout or list or a cell in a table.

According to embodiments, one or more elements in a grid layout or list may be selected and upon selection of a delete option, the contents of the one or more elements may be deleted. Animating panels may appear in the user interface, which may be slid or pushed to perform a "shift cells left" or a "shift cells up" action. As can be appreciated, elements may also be shifted down, to the right, or diagonally. The panels may visually indicate to a user which elements may be moved in place of the deleted elements. The user may directly manipulate the panels, allowing the user visualize how elements may be shifted instead of having to understand terminology in a dialog. Selecting outside the panels may cause the panels to disappear, which may be equivalent to a clear action where other elements are not moved into the place of the deleted elements.

According to embodiments, with whatever input device a user is using to manipulate a panel, the action is gesture-based. A gesture input may include an input made without a mechanical device (e.g., a user body movement) or with a mechanical input device (e.g., with a mouse, touchscreen, stylus, etc.), the input originating from a bodily motion that can be received, recognized, and translated into a selection and/or movement of an element or object on a graphical user interface that mimics the bodily motion. For example, whether he is using a finger, a mouse, or a camera-captured gesture, the user may use a gesturing motion that is intuitive; the manipulation or action may parallel what he wants to happen to the elements in the application.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIG. 7 is an illustration of slider panels being displayed;

FIG. 10 is an illustration of the table after the "shift cells left" action;

FIG. 12 is an illustration of the table after the "shift cells up" action;

DETAILED DESCRIPTION

Figure 1:
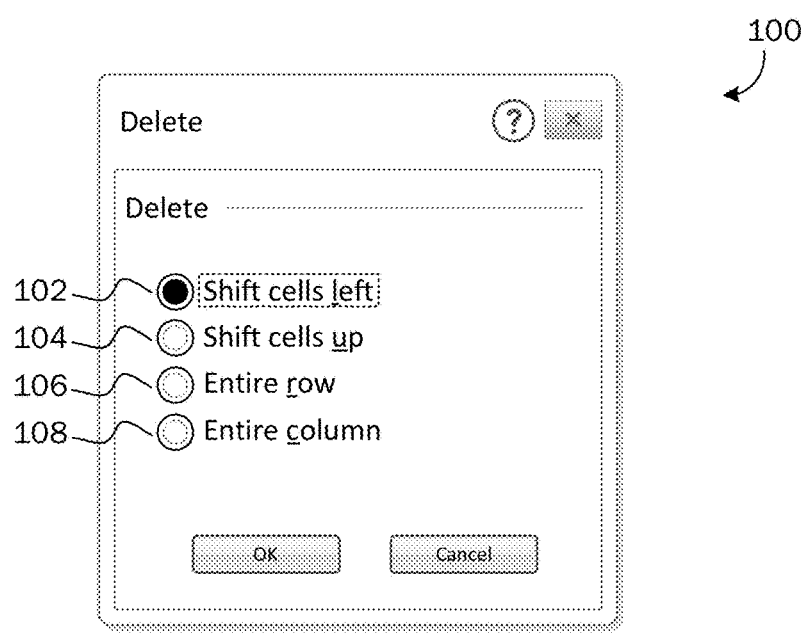
FIG. 1 is an illustration of an example dialog in current applications.

As briefly described above, embodiments of the present invention are directed to providing an intuitive user interface for clearing or deleting a structured data element.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. As previously described above, currently, the difference between delete and clear when working with structured data may be unclear. For example, to delete an element, such as a cell in a table, a user may right click then select delete or click on a delete command from a user interface toolbar. When deleting a structured data element such as a cell, a range of cells, or a row or column in a list, table or spreadsheet, the element or elements in the selected range may disappear and the document may shift to adjust for the absence of the element or elements. A dialog, such as the example dialog illustrated in FIG. 1 may appear when a user initiates a delete action, for example, a delete action from a right-click menu. The illustrated dialog 100 may not be considered ideal because it interrupts the user from the action he/she is trying to complete and may not help the user to easily visualize the action. As illustrated, various selectable functionality options 102,104,106,108 may be presented to the user in the dialog 100. The options may include a "shift cells left" option 102, a "shift cells up" option 104, an "entire row" option 106, and an "entire column" option 108.

A clear functionality may be utilized to delete the contents of a cell or cells without removing the cell itself. That is, the cell itself is not deleted such that other cells would need to move into its place. To clear contents in a cell, a user may select a clear command from a user interface toolbar or select a delete key on a keyboard. Selecting a delete key to clear contents can cause user confusion. As can be appreciated, when a user wants to delete data within a cell but not delete the cell itself, with current user interface designs, the user may be confused as to whether he is deleting the cell itself as a structural object in a spreadsheet or clearing data within a cell.

Figure 2:
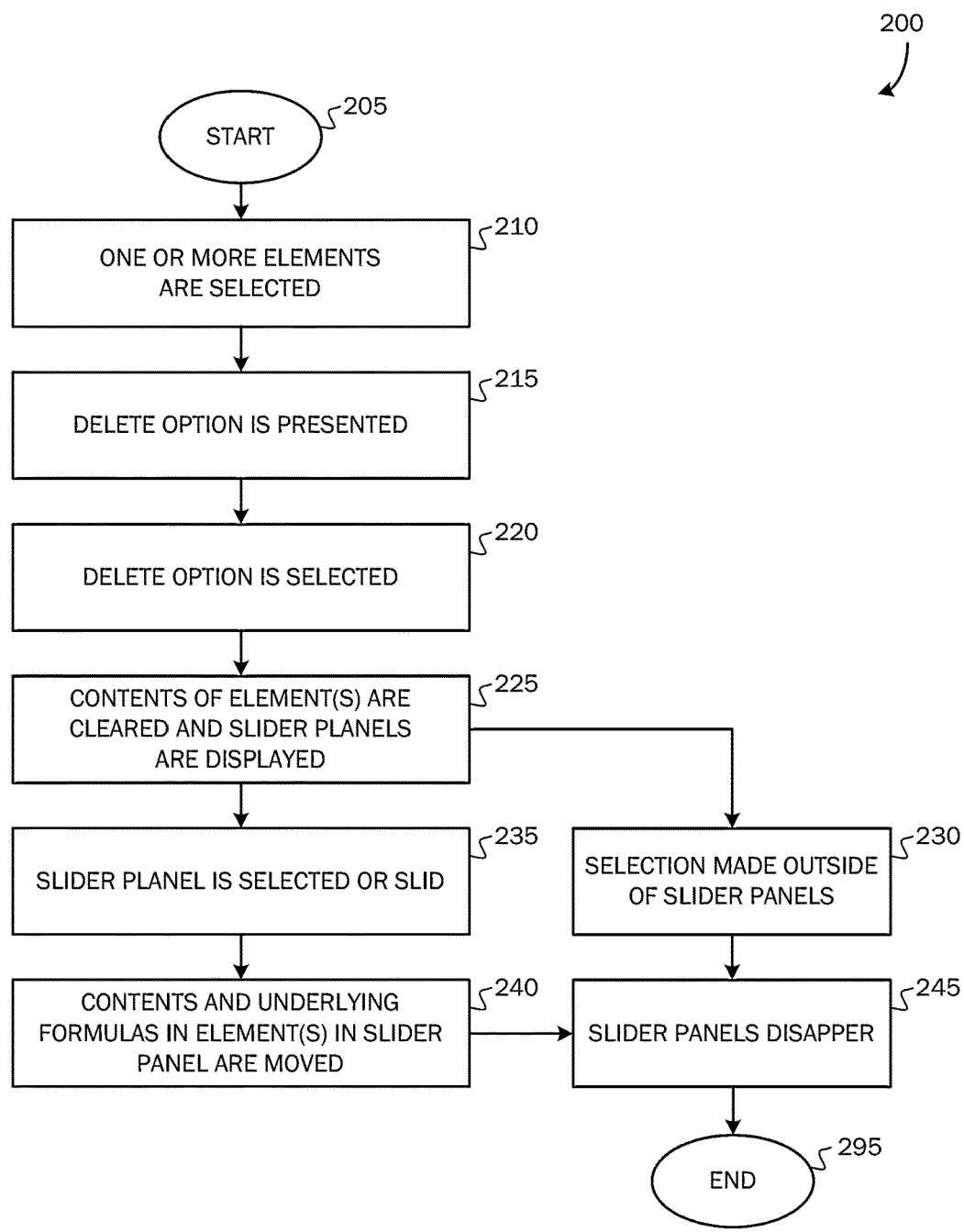
FIG. 2 is a flow chart of a method for providing an intuitive user interface for clearing or deleting a structured data element.

Embodiments of the present invention provide an improved interactive user interface for delete and clear contents functionalities, the improved user interface incorporating intuitive functionalities and removing terminologies that can lead to user confusion. FIG. 2 is a flow chart of a method 200 for providing an intuitive user interface for clearing or deleting a structured data element according to an embodiment. For purposes of illustration, the process flow of method 200 will be described with reference to FIGS. 3-12. With respect to the illustrations and descriptions thereof, an element may herein be referred to as a cell. Embodiments are not limited to providing an intuitive user interface for clearing or deleting a cell in a table but may include providing an intuitive user interface for clearing or deleing various types of structured data elements.

Figure 3:
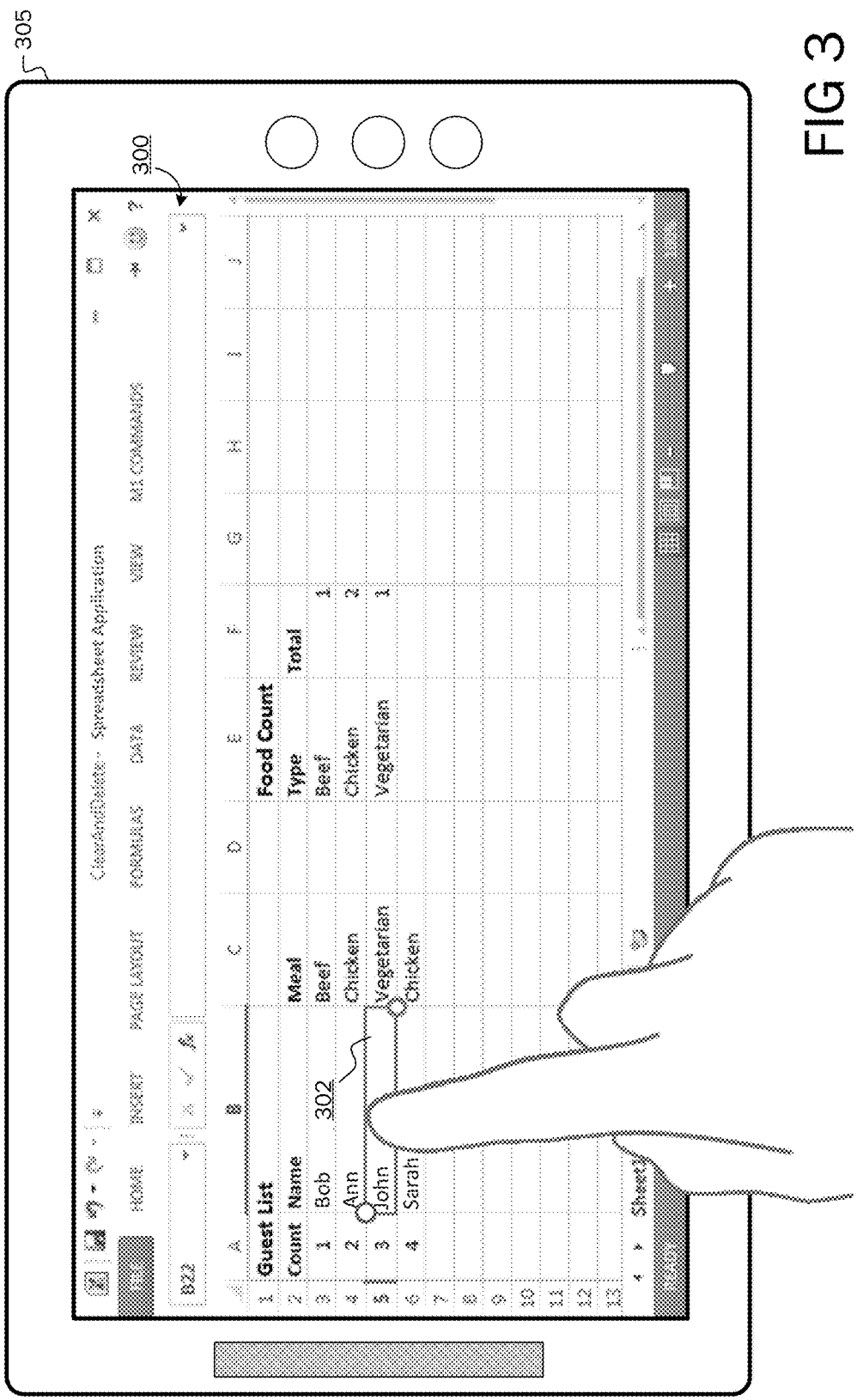
FIG. 3 is an illustration of a user selecting a cell of a table displayed an example user interface.
Figure 4:
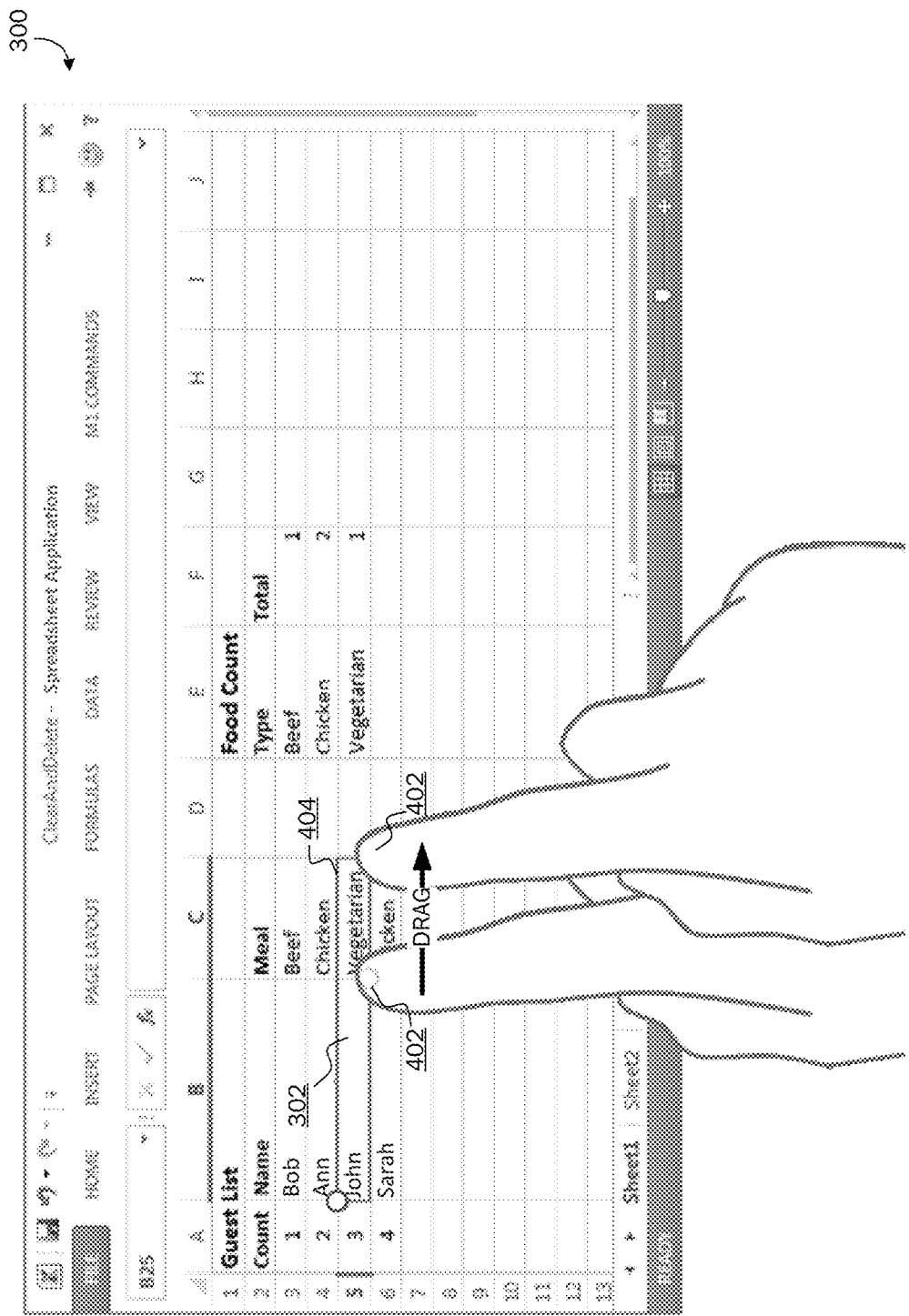
FIG. 4 is an illustration of a user sliding a handle to select a cell range.

The method 200 starts at OPERATION 205 and proceeds to OPERATION 210 where an element such as a cell, a cell range, or a row or column is selected. An element may be selected via various methods, for example, a user dragging a mouse cursor over the cells he wants to select, a combination of keyboard shortcut keys and dragging a mouse cursor, or as illustrated in FIG. 3, if utilizing a touch interface 300, a user may tap on a cell 302 to select it. In FIG. 3, the example touch interface 300 is shown displayed on a tablet computing device 305. It is to be understood that the touch interface 300 and the tablet computing device 305 are one of various types of interfaces and computing devices with which embodiments may be utilized. As shown in FIG. 4, the selection may be expanded by selecting a handle 402 and dragging the handle 402 across the desired cells 302 to select a cell range 404. Although herein referred to in terms of selecting, clearing the contents of, or moving a cell or cell range, embodiments are applicable to selecting, clearing the contents of, or moving an entire row, column, or other type of structured data element.

Figure 5:
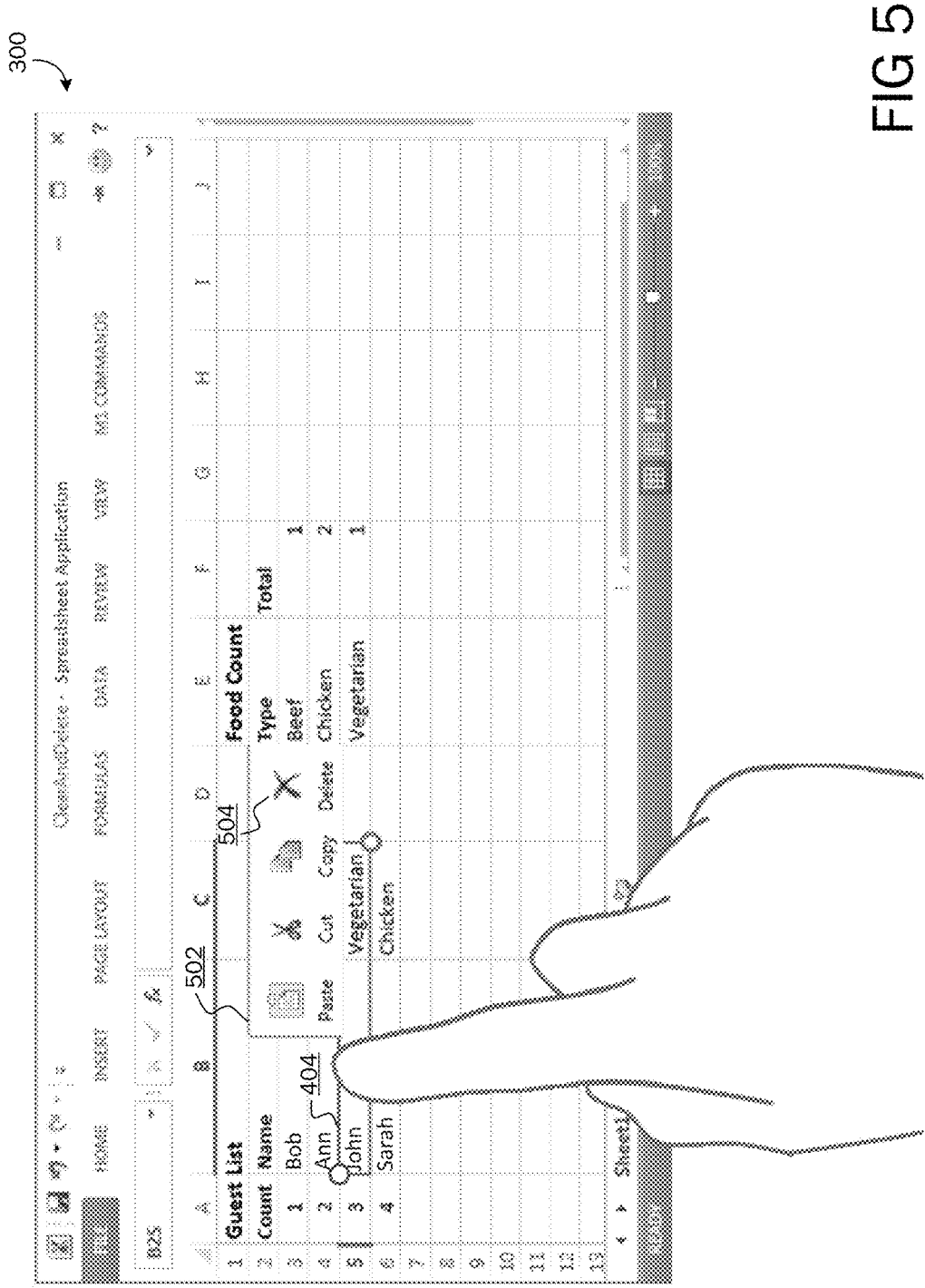
FIG. 5 is an illustration of a delete option being presented in a contextual menu.

Referring back to FIG. 2, the method 200 proceeds to OPERATION 215, where a delete control is presented. The delete control may be presented in a contextual user interface, a toolbar, or in another location or may be a keyboard shortcut key. According to one embodiment and as illustrated in FIG. 5, a context menu 502 may be displayed following a user interaction such as a right mouse click, a mouse hover, or if utilizing a touch interface such as the touch interface 300 illustrated in FIG. 5, a context menu 502 may appear when a user touches and holds (i.e., a press and hold gesture) a cell 302 or cell range 404. The context menu 502 may include a limited set of choices that are available in a current state or context of an application. The available choices may include actions related to the selected cell 302 or cell range 404. As illustrated in FIG. 5, the context menu 502 may include a delete control 504.

Figure 6:
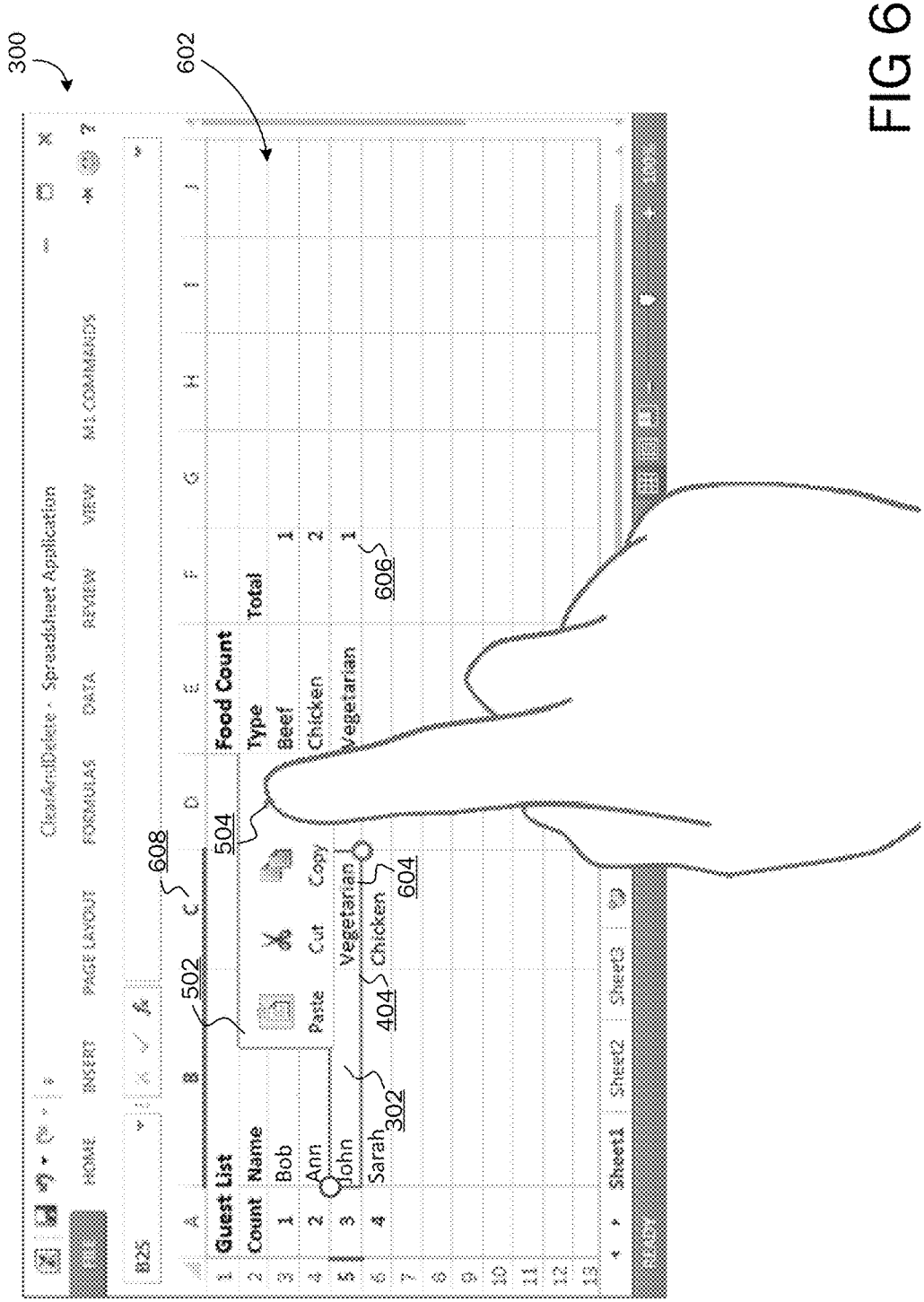
FIG. 6 is an illustration of a user selecting a delete option.
Figure 7:
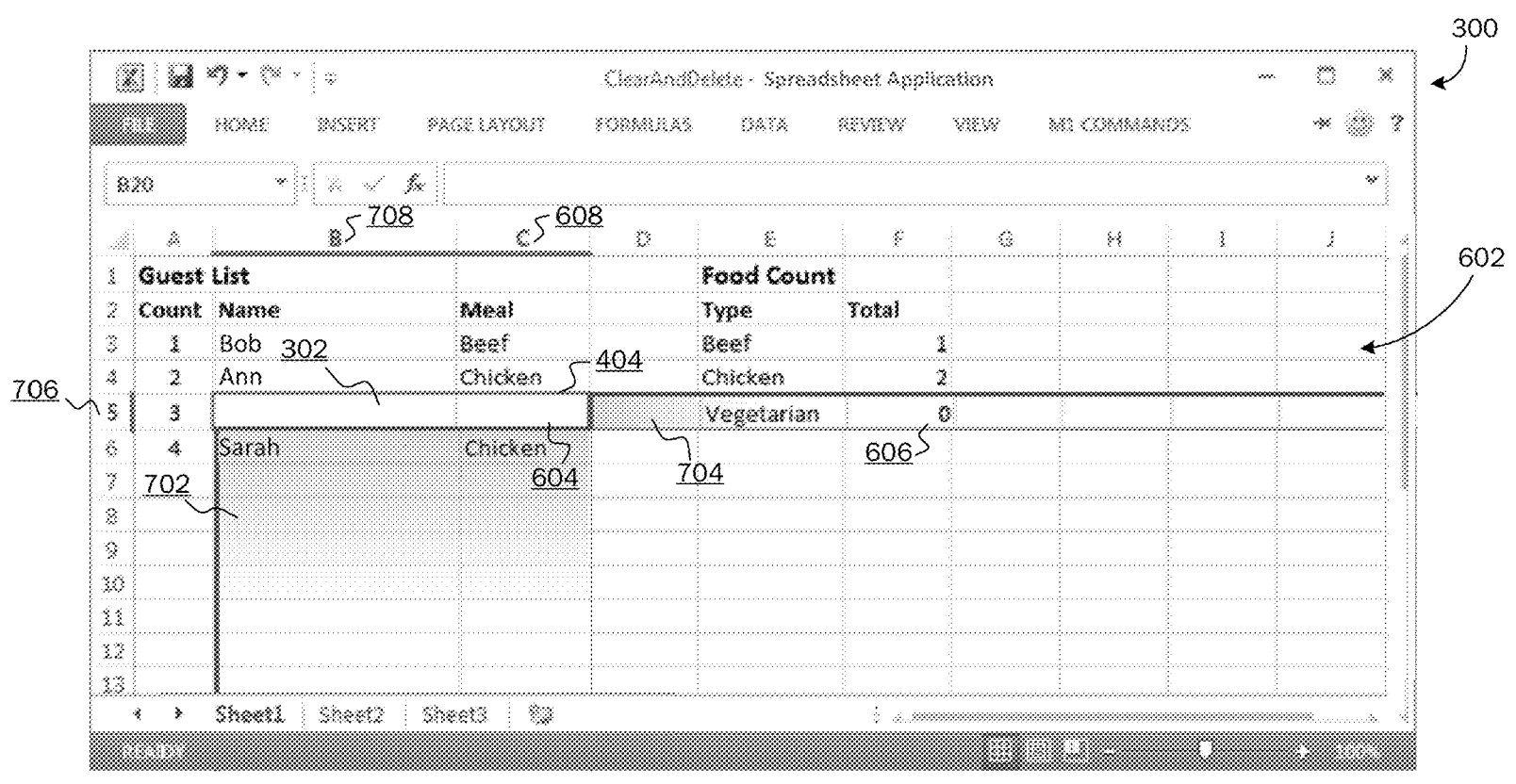

At OPERATION 220, the delete control 504 is selected (as illustrated in FIG. 6), and at OPERATION 225, the contents of the selected cell 302 or cell range 404 are cleared. That is, the cell 302 or cell range 404 itself has not been deleted; only the contents within the cell or call range are deleted. For example, FIG. 6 shows cell B5 302 in the example spreadsheet 602 containing the text "John" and cell C5 604 containing the text "Vegetarian." Cell F5 606 contains a formula that tallies the number of "Vegetarian" entries in the C column 608. Referring now to FIG. 7, after a user selects the delete command 504 in OPERATION 220, cell B5 302 no longer contains the text "John," cell C5 604 no longer contains the text "Vegetarian," and cell F5 606 has been updated to reflect the new tally of "Vegetarian" entries in column C 608 with the absence of the "Vegetarian" entry that was previously in cell C5 604.

According to embodiments, additionally at OPERATION 225, user interface slider panels 702,704 are displayed (as illustrated in FIG. 7). The slider panels 702,704 visually indicate to the user which cells can be moved in place of the cleared cells 302,604 (cell range 404). According to an embodiment, one slider panel 704 may contain cells to the right and in the row(s) 706 of the cleared cells 302,604 (cell range 404) and another slider panel 702 may contain cells below and in the column(s) 708,608 of the cleared cells. The slider panels 702,704 may be utilized as user interface elements to replace the dialog box 100 and options 102,104, 106,108 illustrated in FIG. 1 that are commonly used in current applications. According to another embodiment, a slider panel may contain cells or elements to the left of a cleared element, above a cleared element, or diagonal to a cleared element that may be shifted right, down, or diagonally over a cleared cell respectively.

According to an embodiment, the slider panels 702,704 may be animated to prompt the user to manipulate or move them via a mouse movement, slide of a finger or stylus, a gesture, or other input method known in the art. The slider panels 702,704 may animate in a sliding motion to indicate that they can be slid or pushed. As can be appreciated, it may be more intuitive for a user to see the how content in slider panels 702,704 may be moved into cleared cell range 404 than through text in a dialog 100.

Figure 8:
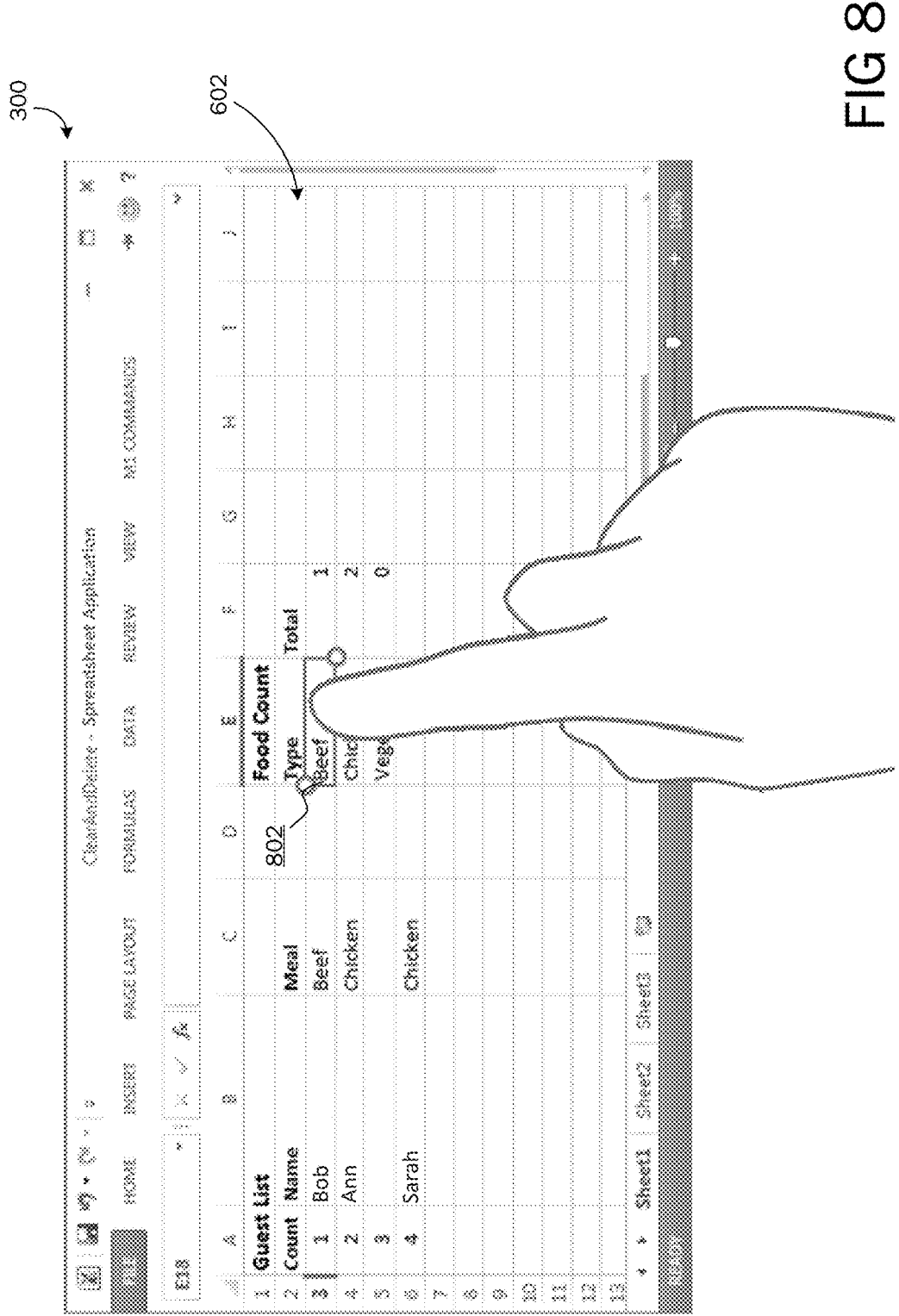
FIG. 8 is an illustration of a user selecting elsewhere to cause the slider panels to disappear.

Referring back to FIG. 2, if the user only wants to perform a clear contents operation and does not want to shift the cells in a column or row into where the contents were cleared, the method 200 proceeds to OPERATION 230 where the user dismisses the slider panels 702,704 by selecting elsewhere in the spreadsheet 602, for example, as illustrated in FIG. 8, tapping or touching another cell 802. At OPERATION 245, and also illustrated in FIG. 8, the slider panels 702,704 disappear.

Figure 9:
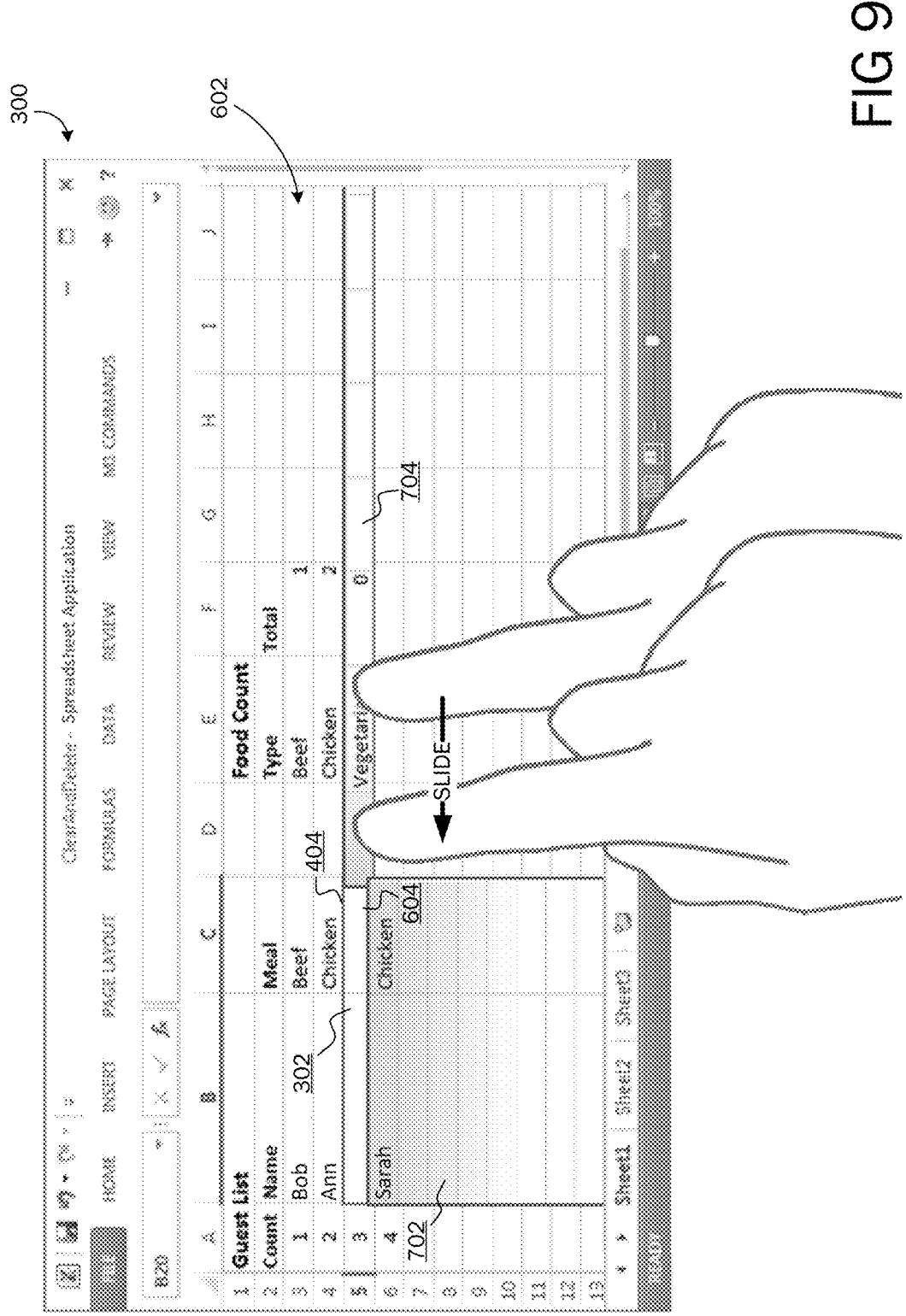
FIG. 9 is an illustration of a user sliding a slider panel to perform a "shift cells left" action.
Figure 11:
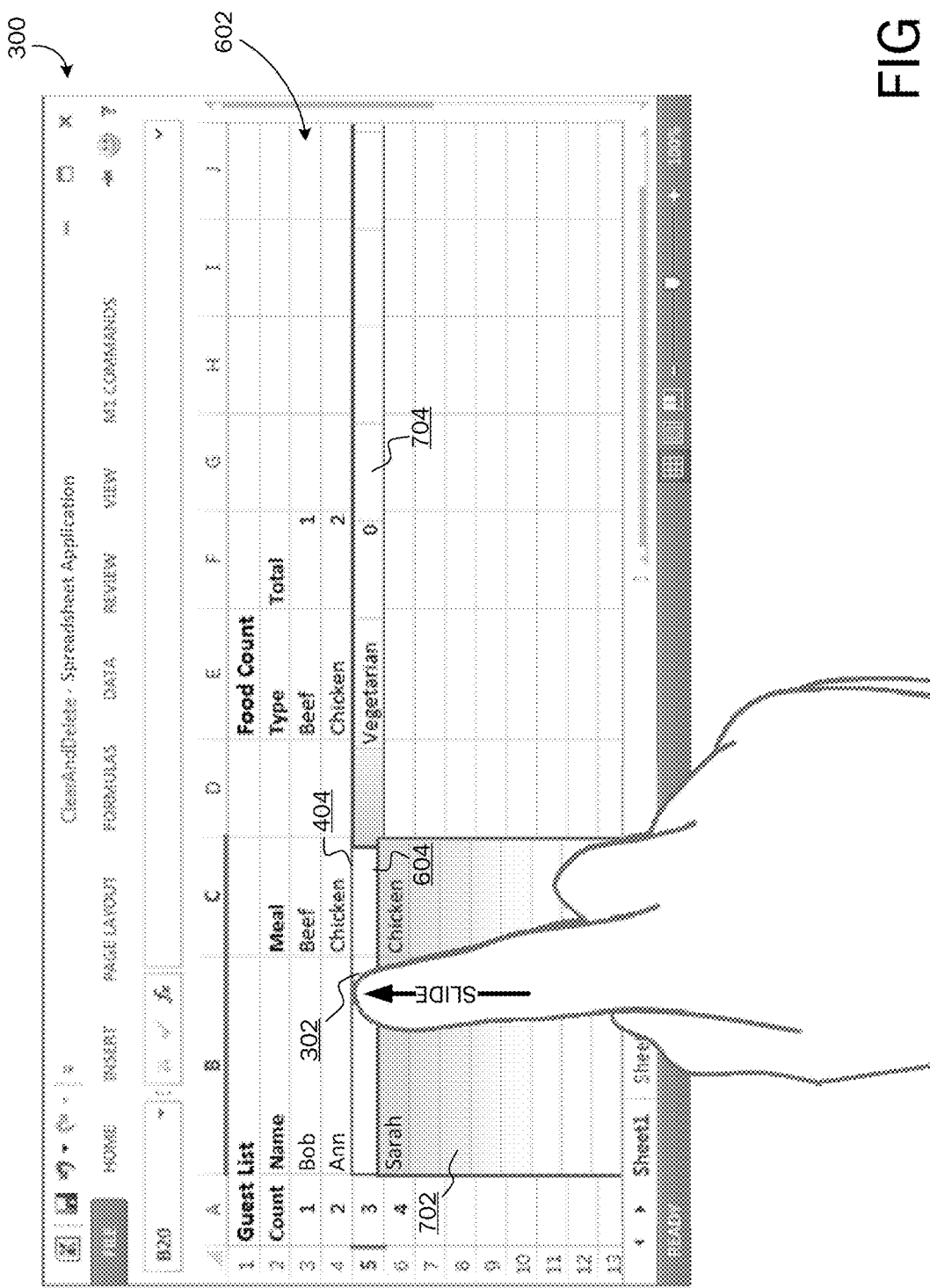
FIG. 11 is an illustration of a user sliding a slider panel to perform a "shift cells up" action.

If, after OPERATION 225, the user wants to shift cells into where the contents were cleared, the method 200 proceeds to OPERATION 235 where a slider panel 702,704 is slid or pushed into the area where the cell range's 404 contents have been cleared. As illustrated in FIG. 9, a horizontal mouse movement, slide of a finger or stylus, a gesture, or other input method known in the art may be utilized to slide or move a slider panel 704 horizontally into the cleared cell range 404. According to another embodiment, a selection (e.g., a mouse click, touch, etc.) on a slider panel 702,704 may be received as an indication to shift the slider panel into the cleared cell range 404. As illustrated in FIG. 11, a vertical mouse movement, slide of a finger or stylus, a gesture, or other input method known in the art may be utilized to slide or move a slider panel 702 vertically into the cleared cell range 404. This operation (240) is comparable to the "shift cells left" option 102 or a "shift cells up" option 104 illustrated in FIG. 1 provided with many current spreadsheet applications. According to embodiments, a slider panel 702,704 may be slid down, to the right, or diagonally into a cleared cell range. For example, when utilized with a right-to-left script such as Arabic, a subsequent element to a deleted element may be positioned to the left of the deleted element which may be selected by a user and shifted into the cleared cell range.

Figure 12:
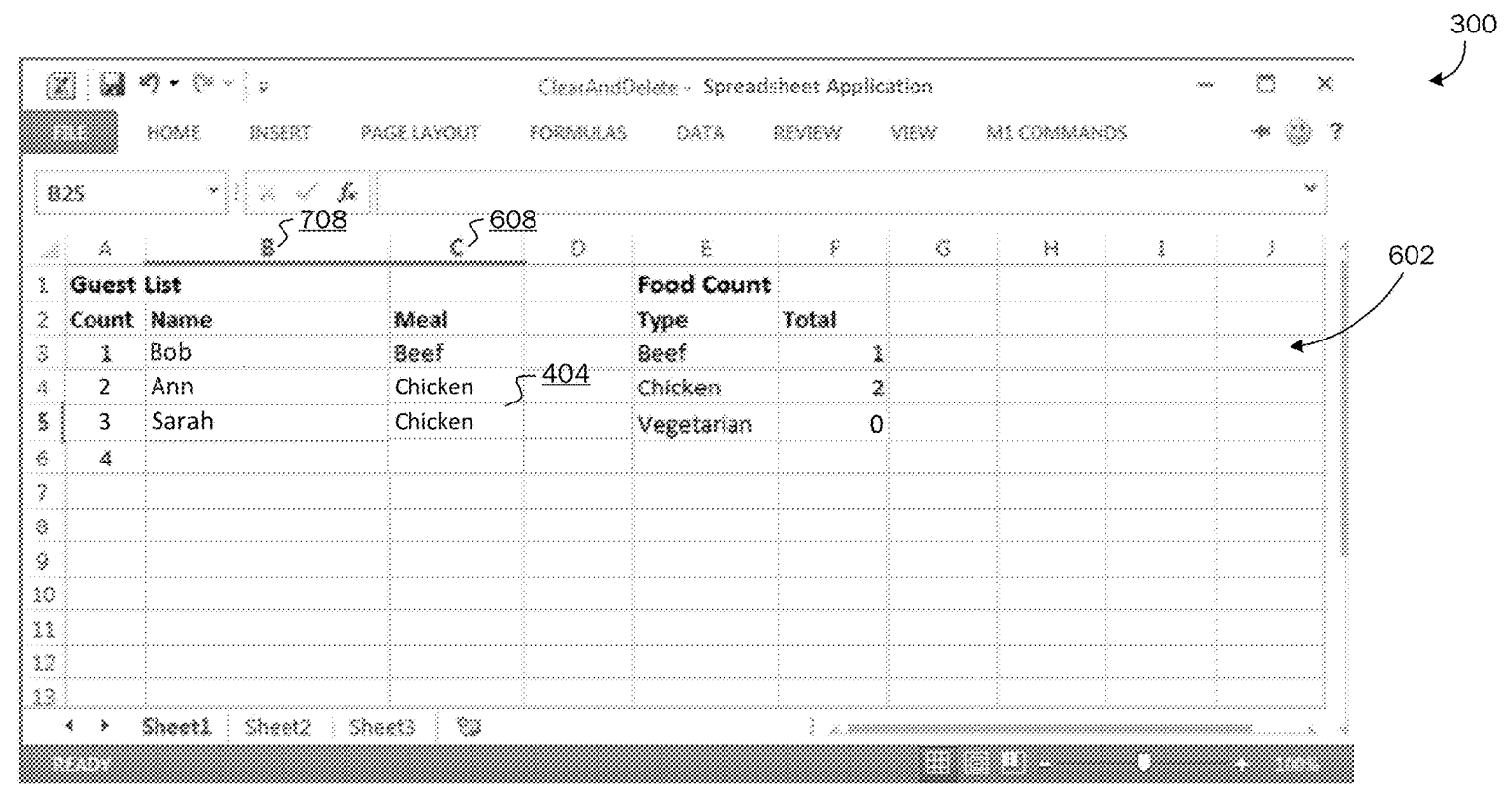

At OPERATION 240 and as illustrated in FIGS. 10 and 12, if a slider panel 704,706 is slid past a predetermined threshold, the slider panel may commit to the slide and the cells in the slid slider panel 704,706 may move into the cleared cell range 404. That is, as illustrated in FIG. 10, the cells in the row(s) 706 of and to the right of the cleared cell range 404 and any underlying formulas that are associated with those cells may be shifted to the left. As illustrated in FIG. 12, the cells in the columns 608,708 of and below the cleared cell range 404 and any underlying formulas that are associated with those cells may be shifted upward. If the slider panel 704,706 is not slid past the predetermined threshold, the slider panel may bounce back to its un-slid state. According to another embodiment, a slider panel 704,706 may be slid and moved into another area in a spreadsheet, for example, an area outside of the cleared cell range 404.

After a slider panel 704,706 is slid (235) and the contents and underlying formulas in the cells in the slider panel are moved (240), the method 200 may proceed to OPERATION 245 where the slider panels 702,704 disappear. The method 200 ends at OPERATION 295.

Figure 13:
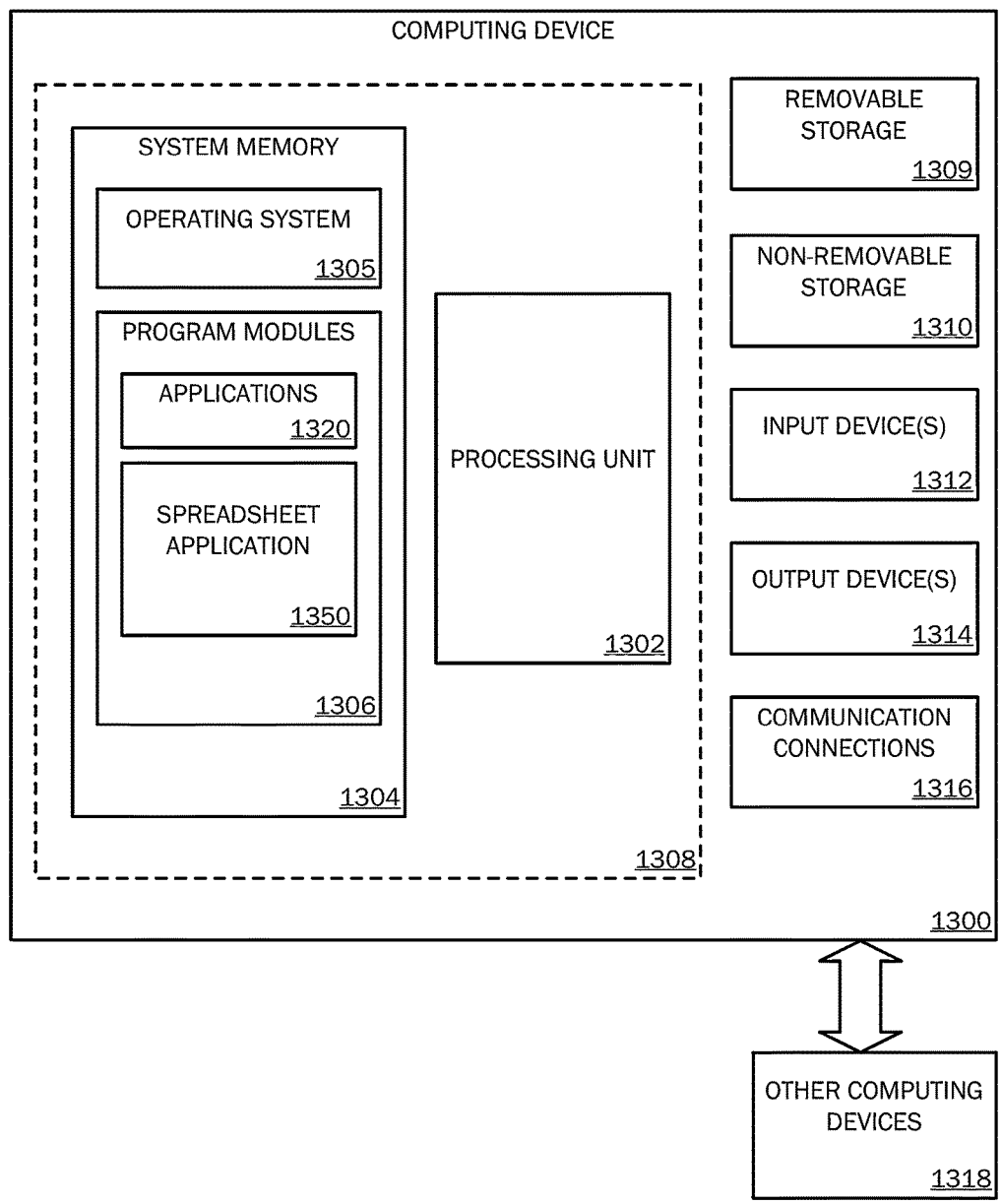
FIG. 13 is a block diagram illustrating example physical components of a computing device with which embodiments of the invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, such as tablet computing device 305, notebook computers, and laptop computers), hand-held devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 13 through 15 and the associated descriptions provide a discussion of a variety of operating environments in which embodiments of the invention may be practiced. However, the devices and systems illustrated and discussed with respect to FIGS. 13 through 15 are for purposes of example and illustration and are not limiting of a vast number of computing device configurations that may be utilized for practicing embodiments of the invention, described herein.

FIG. 13 is a block diagram illustrating example physical components (i.e., hardware) of a computing device 1300 with which embodiments of the invention may be practiced. The computing device components described below may be suitable for the computing devices described above. In a basic configuration, the computing device 1300 may include at least one processing unit 1302 and a system memory 1304. Depending on the configuration and type of computing device, the system memory 1304 may comprise, but is not limited to, volatile storage (e.g., random access memory), non-volatile storage (e.g., read-only memory), flash memory, or any combination of such memories. The system memory 1304 may include an operating system 1305 and one or more program modules 1306 suitable for running software applications 1320 such as a spreadsheet application 1350. The operating system 1305, for example, may be suitable for controlling the operation of the computing device 1300. Furthermore, embodiments of the invention may be practiced in conjunction with a graphics library, other operating systems, or any other application program and is not limited to any particular application or system. This basic configuration is illustrated in FIG. 13 by those components within a dashed line 1308. The computing device 1300 may have additional features or functionality. For example, the computing device 1300 may also include additional data storage devices (removable and/or non-removable) such as, for example, magnetic disks, optical disks, or tape. Such additional storage is illustrated in FIG. 13 by a removable storage device 1309 and a non-removable storage device 1310.

As stated above, a number of program modules and data files may be stored in the system memory 1304. While executing on the processing unit 1302, the program modules 1306, such as the spreadsheet application 1350 may perform processes including, for example, one or more of the stages of the method 200. The aforementioned process is an example, and the processing unit 1302 may perform other processes. Other program modules that may be used in accordance with embodiments of the present invention may include electronic mail and contacts applications, word processing applications, database applications, slide presentation applications, drawing or computer-aided application programs, etc. Although described herein as being performed by a spreadsheet application 1350, embodiments may apply to any application with tables or grid-structured data.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the spreadsheet application 1350 may be operated via application-specific logic integrated with other components of the computing device 1300 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1300 may also have one or more input device(s) 1312 such as a keyboard, a mouse, a pen, a sound input device, a touch input device, etc. The output device(s) 1314 such as a display, speakers, a printer, etc. may also be included. The aforementioned devices are examples and others may be used. The computing device 1300 may include one or more communication connections 1316 allowing communications with other computing devices 1318. Examples of suitable communication connections 1316 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 1304, the removable storage device 1309, and the non-removable storage device 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1300. Any such computer storage media may be part of the computing device 1300.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 14A:
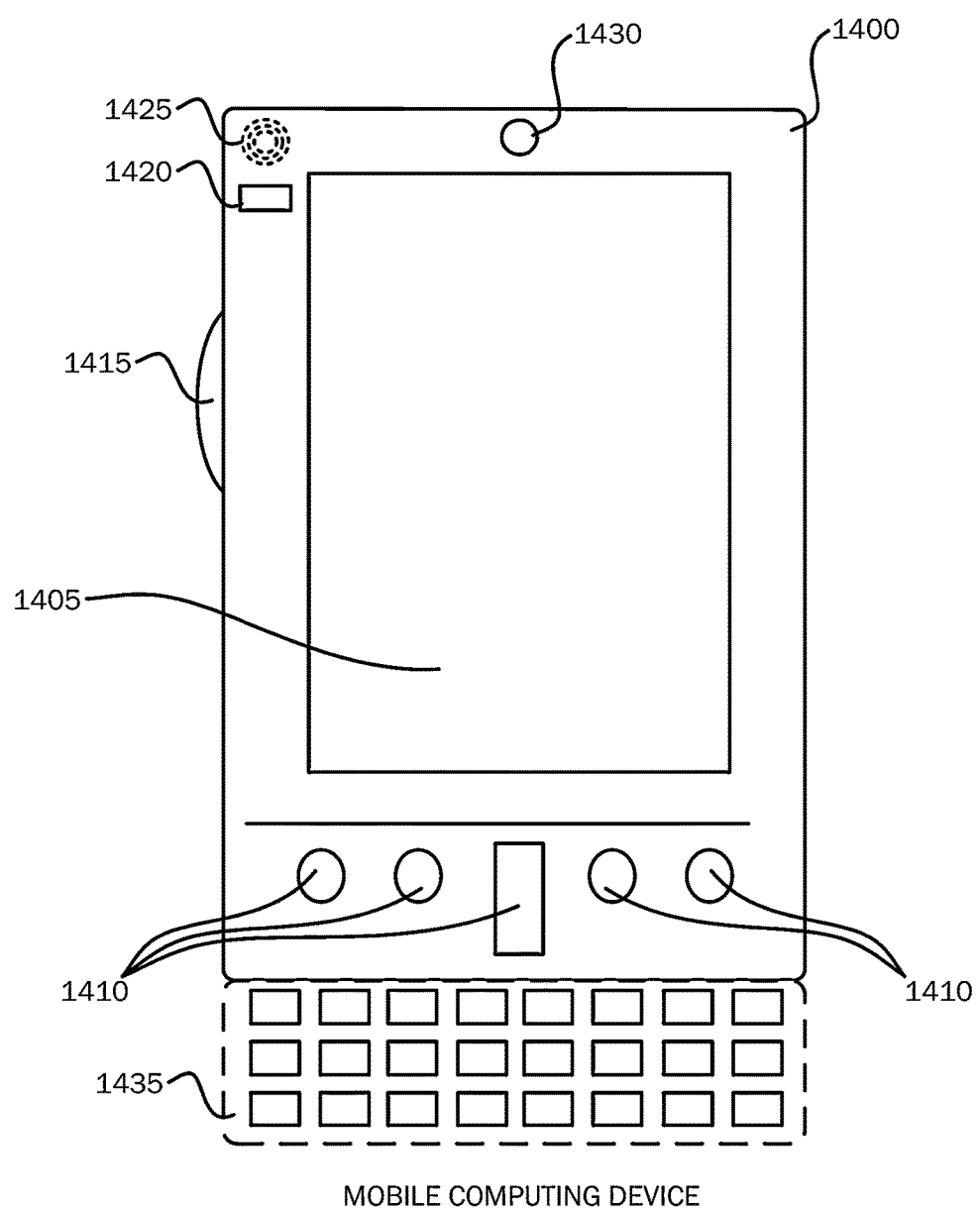
FIGS. 14A and 14B are simplified block diagrams of a mobile computing device with which embodiments of the present invention may be practiced.
Figure 14B:
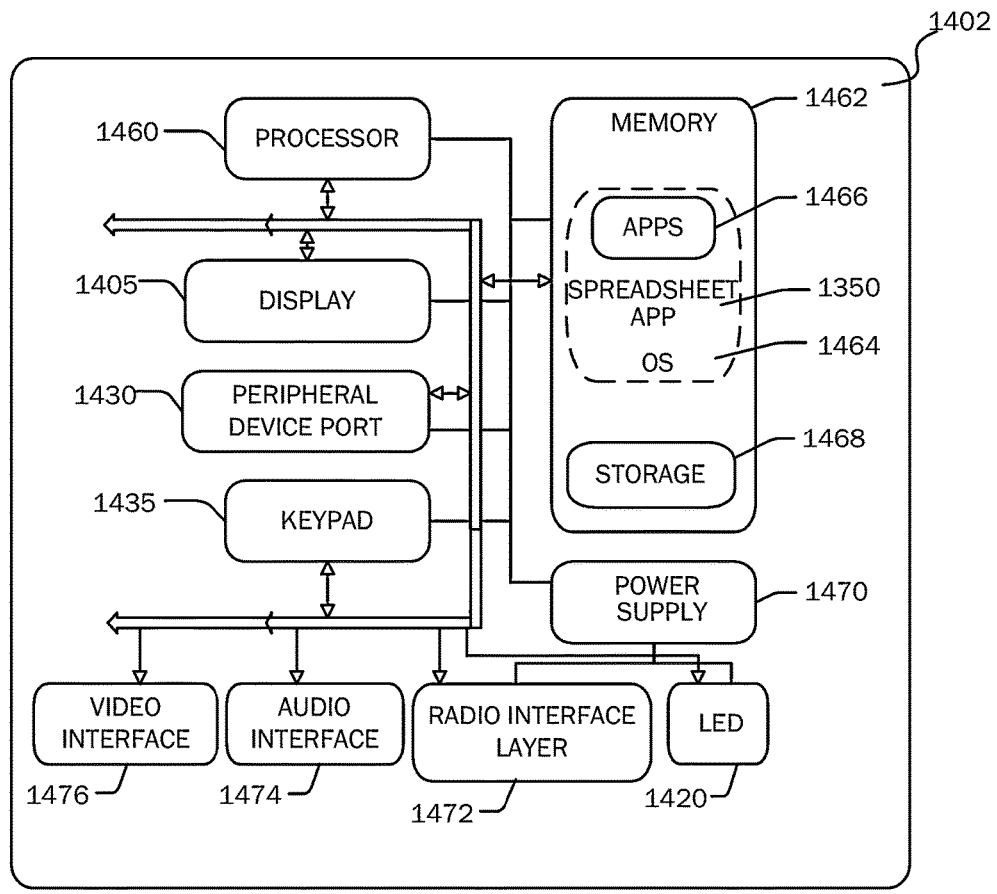
Figure 15:
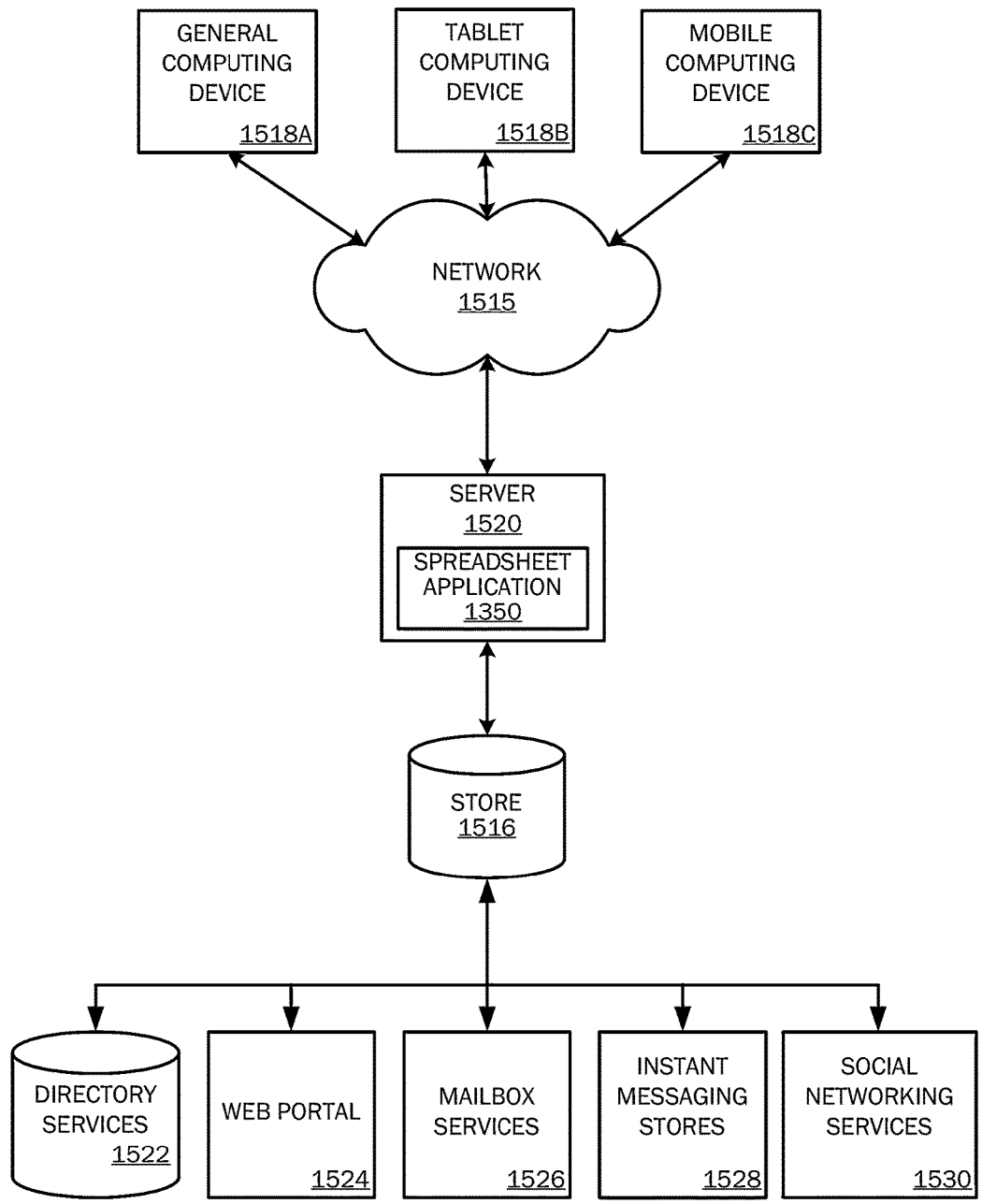
FIG. 15 is a simplified block diagram of a distributed computing system in which embodiments of the present invention may be practiced.

FIGS. 14A and 14B illustrate a mobile computing device 1400, for example, a mobile telephone, a smart phone, a tablet personal computer, such as tablet computing device 305, a laptop computer, and the like, with which embodiments of the invention may be practiced. With reference to FIG. 14A, an exemplary mobile computing device 1400 for implementing the embodiments is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. The display 1405 of the mobile computing device 1400 may also function as an input device (e.g., a touch screen display). If included, an optional side input element 1415 allows further user input. The side input element 1415 may be a rotary switch, a button, or any other type of manual input element. In alternative embodiments, mobile computing device 1400 may incorporate more or less input elements. For example, the display 1405 may not be a touch screen in some embodiments. In yet another alternative embodiment, the mobile computing device 1400 is a portable phone system, such as a cellular phone. The mobile computing device 1400 may also include an optional keypad 1435. Optional keypad 1435 may be a physical keypad or a "soft" keypad generated on the touch screen display. In various embodiments, the output elements include the display 1405 for showing a graphical user interface (GUI), a visual indicator 1420 (e.g., a light emitting diode), and/or an audio transducer 1425 (e.g., a speaker). In some embodiments, the mobile computing device 1400 incorporates a vibration transducer for providing the user with tactile feedback. In yet another embodiment, the mobile computing device 1400 incorporates input and/or output ports, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one embodiment of a mobile computing device. That is, the mobile computing device 1400 can incorporate a system (i.e., an architecture) 1402 to implement some embodiments. In one embodiment, the system 1402 is implemented as a "smart phone" capable of running one or more applications (e.g., browser, e-mail, calendaring, contact managers, messaging clients, games, and media clients/players). In some embodiments, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400, including the spreadsheet application 1350 described herein.

The system 1402 has a power supply 1470, which may be implemented as one or more batteries. The power supply 1470 might further include an external power source, such as an AC adapter or a powered docking cradle that supplements or recharges the batteries. The system 1402 may also include a radio 1472 that performs the function of transmitting and receiving radio frequency communications. The radio 1472 facilitates wireless connectivity between the system 1402 and the "outside world", via a communications carrier or service provider. Transmissions to and from the radio 1472 are conducted under control of the operating system 1464. In other words, communications received by the radio 1472 may be disseminated to the application programs 1466 via the operating system 1464, and vice versa.

The radio 1472 allows the system 1402 to communicate with other computing devices, such as over a network. The radio 1472 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 1402 provides notifications using the visual indicator 1420 that can be used to provide visual notifications and/or an audio interface 1474 producing audible notifications via the audio transducer 1425. In the illustrated embodiment, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with embodiments of the present invention, the microphone may also serve as an audio sensor to facilitate control of notifications, as will be described below. The system 1402 may further include a video interface 1476 that enables an operation of an on-board camera 1430 to record still images, video stream, and the like.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14B by the non-volatile storage area 1468. Computer storage media may include volatile and nonvolatile, removable and non-removable media implemented in any method or technology for storage of information, such as computer readable instructions, data structures, program modules, or other data.

Data/information generated or captured by the mobile computing device 1400 and stored via the system 1402 may be stored locally on the mobile computing device 1400, as described above, or the data may be stored on any number of storage media that may be accessed by the device via the radio 1472 or via a wired connection between the mobile computing device 1400 and a separate computing device associated with the mobile computing device 1400, for example, a server computer in a distributed computing network, such as the Internet. As should be appreciated such data/information may be accessed via the mobile computing device 1400 via the radio 1472 or via a distributed computing network. Similarly, such data/information may be readily transferred between computing devices for storage and use according to well-known data/information transfer and storage means, including electronic mail and collaborative data/information sharing systems.

FIG. 15 illustrates one embodiment of the architecture of a system for providing the spreadsheet application 1350 to one or more client devices, as described above. Content developed, interacted with or edited in association with the spreadsheet application 1350 may be stored in different communication channels or other storage types. For example, various documents may be stored using a directory service 1522, a web portal 1524, a mailbox service 1526, an instant messaging store 1528, or a social networking site 1530. The spreadsheet application 1350 may use any of these types of systems or the like for providing an intuitive user interface for clearing or deleting a structured data element as described herein. A server 1520 may provide the spreadsheet application 1350 to clients. As one example, the server 1520 may be a web server providing the spreadsheet application 1350 over the web. The server 1520 may provide the spreadsheet application 1350 over the web to clients through a network 1515. By way of example, the client computing device 1518 may be implemented as the computing device 1300 and embodied in a personal computer 1518a, a tablet computing device 1518b,305 and/or a mobile computing device 1518c (e.g., a smart phone). Any of these embodiments of the client computing device 1518 may obtain content from the store 1516. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

We claim:

1. A method for providing an intuitive user interface for clearing or deleting a structured data element, the method comprising:
   receiving an indication of a selection, via a touch input to a touch screen display of a computing device, to clear content of one or more elements in a data structure that includes other elements that include other content that is not indicated for clearing;
   clearing the content of the one or more elements;
   in response to clearing the content of the one or more elements:
      identifying at least two directions from which the other elements of the data structure extend within the data structure from the one or more elements from which the content was cleared;
      displaying a slider panel for each of the at least two directions identified, wherein each slider panel visually indicates the other elements in a given direction within the data structure relative to the one or more elements from which the content was cleared by visually encompassing the one or more elements along the given direction, wherein at least one of the one or more visually encompassed elements in the given direction abuts at least one of the one or more elements from which the content was cleared; and
   receiving a selection of a given slider panel by sliding the given slider panel via a sliding touch input to the touch screen display; and
   in response to the sliding of the given slider panel:
      deleting the one or more elements from which the content was cleared; and
      shifting, along with the sliding slider panel, the other elements from the given direction associated with the given slider panel to replace the one or more elements in the data structure.

2. The method of claim 1, further comprising:
   receiving an indication of the selection of the given slider panel replacing a range of elements with the contents of elements contained in the selected slider panel.

3. The method of claim 2, wherein receiving the indication of the selection of the given slider panel further comprises receiving an indication of a movement of the selected given slider panel over the range of elements.

4. The method of claim 3, wherein receiving the indication of the movement of the selected given slider panel includes one of a horizontal movement or a vertical movement of the selected given slider panel over the one or more elements with the deleted contents.

5. The method of claim 3, wherein receiving the indication of the movement of the selected given slider panel includes a movement of the selected given slider panel to an area outside of the one or more elements with the deleted contents.

6. The method of claim 2, wherein replacing the range of elements with the contents of elements contained in the selected given slider panel includes replacing the range of elements with the contents and any formulas contained in the elements in the selected slider panel.

7. The method of claim 1, further comprising:
   receiving an indication of a selection in the data structure outside of the one or more slider panels; and
   removing the one or more slider panels from display.

8. The method of claim 1, wherein displaying the one or more slider panels includes animating the one or more slider panels to indicate that the one or more slider panels can be moved.

9. A computing system for providing an intuitive user interface for clearing or deleting a structured data element, the computing system comprising:
   a touch screen display; and
   a processor to:
      receive an indication of a selection, via a touch input to the touch screen display, to clear content of one or more elements in a data structure that includes a plurality of elements, including the one or more elements and other elements, wherein the other elements include other content that is not indicated for clearing;
      clear the content of the one or more elements;
      identify at least two directions from which the other elements of the plurality of elements extend within the data structure from the one or more elements from which the content was cleared;
      in response to clearing the content of the one or more elements, display a slider panel for each of the at least two directions identified, wherein each slider panel visually indicates the other elements in a given direction within the data structure relative to the one or more elements from which the content was cleared by visually encompassing the one or more elements along the given direction, wherein at least one of the one or more visually encompassed elements in the given direction abuts at least one of the one or more elements from which the content was cleared;
      receive a selection of a given slider panel by sliding the given slider panel via a sliding touch input to the touch screen display; and
      in response to the sliding of the given slider panel:
         deleting the one or more elements from which the content was cleared; and
         shifting, along with the sliding slider panel, the other elements from the given direction that is associated with the given slider panel to replace the one or more elements in the data structure.

10. The system of claim 9, wherein the processor is further operable to:
    receive an indication of the selection of the given slider panel; and
    replace a range of elements with the contents of elements contained in the selected given slider panel.

11. The system of claim 10, wherein the processor is further operable to receive an indication of a movement of the selected given slider panel over a range of elements in the data structure.

12. The system of claim 11, the processor is further operable to replace the range of elements with the contents and any formulas contained in elements in the moved slider panel.

13. The system of claim 11, wherein the indication of the movement of the slider panel over the range of elements indicates one of:
- a horizontal movement of the selected given slider panel over the one or more elements with the deleted contents;
- a vertical movement of the selected given slider panel over the one or more elements with the deleted contents;
- a diagonal movement of the selected given slider panel over the one or more elements with the deleted contents; or
- a movement of the selected given slider panel over elements in an area in the data structure outside of the one or more elements with the deleted contents.

14. The system of claim 9, the processor further operable to:
- receive an indication of a selection in the data structure outside of the one or more slider panels; and
- remove the one or more slider panels from display.

15. The system of claim 9, the processor further operable to animate the one or more slider panels to indicate that the panels can be moved.

16. A non-transitory computer-readable medium having computer-executable instructions for providing an intuitive user interface for clearing or deleting a structured data element, comprising:
- receiving an indication of a selection, via a touch input to a touch screen display of the computing device, to clear content of one or more elements in a data structure that includes other elements, wherein the other elements include other content that is not indicated for clearing;
- clearing the content of the one or more elements;
- in response to clearing the content of the one or more elements:
  - identifying at least two directions from which the other elements of the data structure extend from the one or more elements from which the content was cleared; and
  - displaying a slider panel for each of the at least two directions identified, wherein each slider panel visually indicates the other content of the other elements in a given direction within the data structure relative to the one or more elements from which the content was cleared by visually encompassing the one or more elements along the given direction, wherein at least one of the one or more visually encompassed elements in the given direction abuts at least one of the one or more elements from which the content was cleared;
- receiving a selection of a given slider panel by sliding the given slider panel via sliding touch input to the touch screen display; and
- in response to the sliding of the given slider panel:
  - deleting the one or more elements from which the content was cleared; and
  - shifting, along with the sliding slider panel, the other elements from the given direction to replace the one or more elements in the data structure.

17. The non-transitory computer-readable medium of claim 16, further comprising:
- receiving an indication of the selection of the given slider panel, wherein the indication comprises one of:
- an indication of a horizontal movement of the given slider panel over the one or more elements with the deleted contents;
- an indication of a vertical movement of the given slider panel over the one or more elements with the deleted contents;
- an indication of a diagonal movement of the given slider panel over the one or more elements with the deleted contents; or
- an indication of a movement of the given slider panel over elements in an area in the data structure outside of the one or more elements with the deleted contents.

18. The non-transitory computer-readable medium of claim 17, further comprising:
- in response to receiving the indication of the selection of the given slider panel, replacing the elements with contents of elements contained in the given slider panel.

19. The non-transitory computer-readable medium of claim 16, further comprising:
- receiving an indication of a selection in the data structure outside of the one or more slider panels; and
- removing the one or more slider panels from display.

* * * * *